United States Patent [19]
Yoshida et al.

[11] Patent Number: 5,644,479
[45] Date of Patent: Jul. 1, 1997

[54] SWITCHING POWER SUPPLY DEVICE

[75] Inventors: Koji Yoshida, Hirakata; Takuya Ishii, Suita, both of Japan

[73] Assignee: Matsushita Electric Industrial Co. Ltd., Japan

[21] Appl. No.: 325,928

[22] Filed: Oct. 18, 1994

[30] Foreign Application Priority Data

Oct. 27, 1993 [JP] Japan .................................. 5-268706

[51] Int. Cl.$^6$ .................................................. H02M 3/335
[52] U.S. Cl. ............................... 363/16; 363/97; 363/131
[58] Field of Search ............................... 363/15, 16, 40, 363/97, 131

[56] References Cited

U.S. PATENT DOCUMENTS

| | | | |
|---|---|---|---|
| 4,857,822 | 8/1989 | Tabisz et al. | 363/16 |
| 5,490,052 | 2/1996 | Yoshida et al. | 363/15 |

Primary Examiner—Peter S. Wong
Assistant Examiner—Shawn Riley
Attorney, Agent, or Firm—Beveridge, Degrandi, Weilacher and Young

[57] ABSTRACT

A switching power supply device which includes a series circuit constituted by a first switching element which is connected to an input voltage and which is at least repeatedly turned on and off and a second switching element which is repeatedly turned on and off alternating with the first switching element. A first capacitor is connected to one end of the second switching element. A transformer having a primary winding is connected to the second switching element and the first capacitor. A series circuit constituted by a second capacitor and a rectifier diode is connected across the secondary winding of the transformer, and a series circuit constituted by an inductance element and a smoothing capacitor is connected across the rectifier diode. A control circuit controls the turning on and off of the first and second switching elements based on the voltage across the smoothing capacitor. The voltage across the smoothing capacitor is supplied as the output.

10 Claims, 11 Drawing Sheets

FIG. 4(a) $v_{G1}$
FIG. 4(b) $v_{G2}$
FIG. 4(c) $i_P$
FIG. 4(d) $v_D$
FIG. 4(e) $i_S$
FIG. 4(f) $v_S$
FIG. 4(g) $i_S$
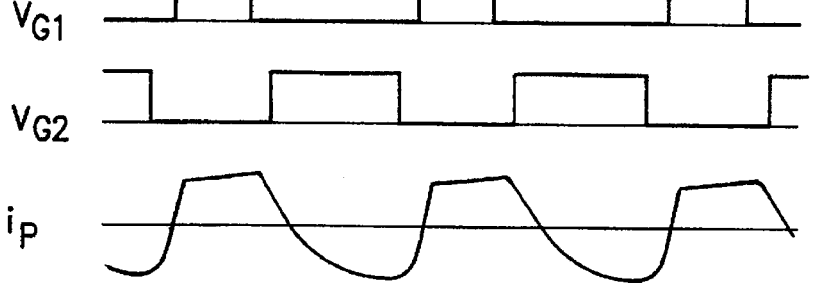
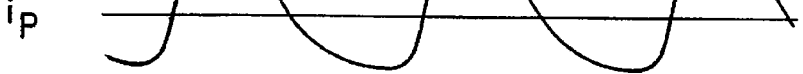
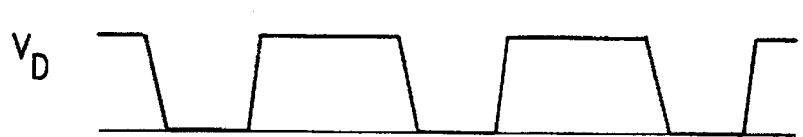
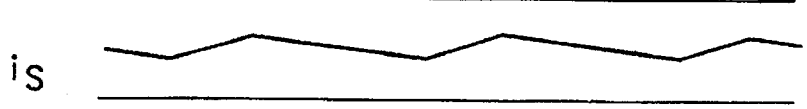

FIG. 6(a) $V_{G1}$ 
FIG. 6(b) $V_{G2}$ 
FIG. 6(c) $i_P$ 
FIG. 6(d) $V_D$ 
FIG. 6(e) $i_S$ 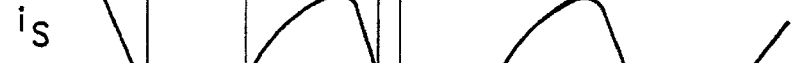
FIG. 6(f) $V_S$ 
FIG. 6(g) $i_L$ 
$t_1$ $t_2$ $t_3$ $t_4$ FIG. 8(a) $V_{G1}$
FIG. 8(b) $V_{G2}$
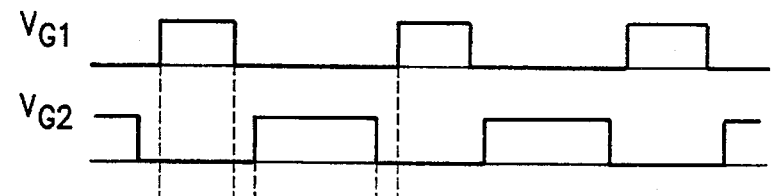
FIG. 8(c) $i_P$
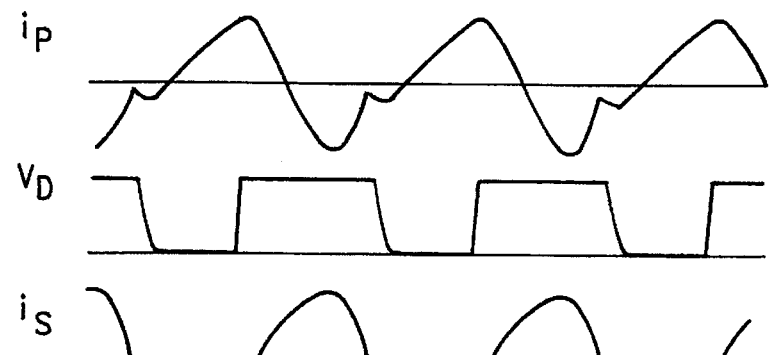
FIG. 8(d) $V_D$
FIG. 8(e) $i_S$
FIG. 8(f) $V_S$
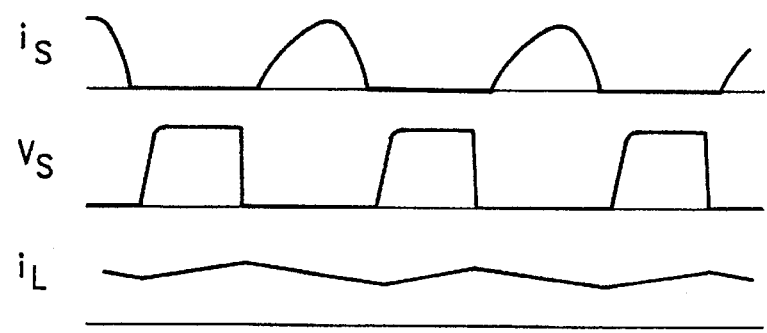
FIG. 8(g) $i_L$

FIG. 11(a) (PRIOR ART) $V_{G1}$ 
FIG. 11(b) (PRIOR ART) $V_{G2}$ 
FIG. 11(c) (PRIOR ART) $i_{D1}$ 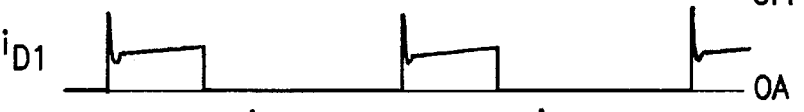
FIG. 11(d) (PRIOR ART) $i_{D2}$ 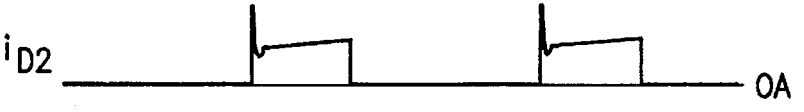
FIG. 11(e) (PRIOR ART) $V_D$ 
FIG. 11(f) (PRIOR ART) $V_S$ 
FIG. 11(g) (PRIOR ART) $i_L$ 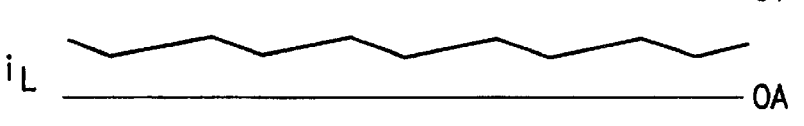

SWITCHING POWER SUPPLY DEVICE

BACKGROUND OF THE INVENTION

1. Field of the Invention

The present invention relates to a switching power supply device for supplying a stabilized DC voltage to industrial and consumer electronic apparatuses.

2. Description of the Related Arts

The recent tendency toward electronic apparatuses of lower cost, smaller size, higher performance and higher energy efficiency has resulted in a strong demand for switching power supply devices which are more compact, stable in their output and highly efficient.

A conventional switching power supply device will now be described. FIG. 10 shows a circuit configuration of a half bridge converter which is a conventional switching power supply device. In FIG. 10, 1 represents an input DC power supply whose voltage is represented by $V_{IN}$. 2 and 2' represent input terminals to which the input DC power supply 1 is connected. 3 represents a first switching element, and 5 represents a second switching element. The first switching element 3 and second switching element 5 are alternately and repeatedly turned on and off and are connected to the input terminals 2 and 2' in series. 18 and 19 represent first and second capacitors, respectively, which are connected to the input terminals 2 and 2' in series. The electric potential of the connection point between the first capacitor 18 and second capacitor 19 is represented by $V_C$. 20 represents a transformer which has a primary winding 20a, a first secondary winding 20b and a second secondary winding 20c. The same turn ratio n:1 is employed between the primary winding 20a and the first secondary winding 20b and between the primary winding 20a and the second secondary winding 20c. The primary winding 20a of the transformer is connected to the connection point between the first switching element 3 and the second switching element 5 at one end thereof and is connected to the connection point between the first capacitor 18 and the second capacitor 19 at the other end thereof. 21 and 22 represent first and second rectifier diodes, respectively, whose anodes are connected respectively to the first secondary winding 20b and the second secondary winding 20c of the transformer and whose cathodes are connected to each other. 11 represents an inductance element, and 12 represents a smoothing capacitor. The inductance element 11 and the smoothing capacitor 12 are connected in series, and the resultant series circuit is connected to the connection point between the first rectifier diode 21 and the second rectifier diode 22 at one end thereof and to the connection point between the first secondary winding 20b and the second secondary winding 20c of the transformer 20 at the other end thereof. This series circuit smoothes a voltage which has been rectified by the first rectifier diode 21 and the second rectifier diode 22 to provide an output voltage. 13 and 13' are output terminals. The electrostatic capacity of the smoothing capacitor 12 is sufficiently large, and an output voltage $V_O$ is outputted to the output terminals 13 and 13'. 14 represents a load which is connected to the output terminals 13 and 13' and consumes the electric power. 15 represents a control circuit which drives the first switching element 3 and the second switching element 5 at predetermined on-off ratios to stabilize the output DC voltage $V_O$.

The operation of a switching power supply device having the above-described configuration will now be described (see FIGS. 11(a), 11(b), 11(c), 11(d), 11(e), 11(f), and 11(g). When the first switching element 3 is on, the voltage $V_C$ is applied to the primary winding 20a of the transformer to produce a voltage $V_C/n$ at the first secondary winding 20b of the transformer. As a result, the first rectifier diode 21 is turned on; the second rectifier diode 22 is turned off; and a voltage $V_C/n-V_O$ is applied to the inductance element 11. A current flows through the first switching element 3, which is the sum of the primary-converted values of the excitation current of the transformer 20 and the excitation current of the inductance element 11. When the first switching element 3 is turned off, the secondary current is divided into separate flows through the first secondary winding 20b and the second secondary winding 20c so that the excitation energy of the transformer 20 will become continuous; the first rectifier diode 21 and the second rectifier diode 22 are turned on; induced voltages of the first secondary winding 20b and the second secondary winding 20c become zero; and a voltage $-V_O$ is applied to the inductance element 11. Then, as the second switching element 5 is turned on, a voltage $V_{IN}-V_C$ is applied to the primary winding 20a of the transformer; a voltage $(V_{IN}-V_C)/n$ is generated at the second secondary winding 20c of the transformer; the first rectifier diode 21 is turned off; the second rectifier diode 22 is turned on; and a voltage $(V_{IN}-V_C)/n-V_C$ is applied to the inductance element 11. A current flows through the second switching element 5, which is the sum of the primary-converted values of the excitation current of the transformer 20 and the excitation current of the inductance element 11. When the second switching element 5 is turned off, the secondary current is divided into separate flows through the first secondary winding 20b and the second secondary winding 20c so that the excitation energy of the transformer 20 will become continuous; the first rectifier diode 21 and the second rectifier diode 22 are turned on; induced voltages of the first secondary winding 20b and the second secondary winding 20c become zero; and a voltage $V_O$ is applied to the inductance element 11 in the opposite direction. If the on-off ratios of the first switching element 3 and the second switching element 5 are set so that they have the same on time $T_{ON}$ and if both an off time from the turn off of the first switching element 3 to the turn on of the second switching element 5 and further an off time from the turn off of the second switching element 5 to the turn on of the first switching element 5 are the same on time $T_{OFF}$ as shown in FIG. 11, the magnetic flux of the transformer 20 is reset after each cycle in a steady operational state. As a result, the following equation is obtained.

$$(V_{IN}-V_C) \times T_{ON} = V_C \times T_{ON}$$

Therefore:

$$V_C = V_{IN}/2$$

The following equation is derived from the resetting conditions for the inductance element 11.

$$(V_{IN}/2 - V_O) \times T_{ON} = V_O \times T_{OFF}$$

Therefore:

$$V_O = \delta V_{IN}/2$$

where $\delta = T_{ON}/(T_{ON}+T_{OFF})$. That is, the output voltage $V_O$ can be stabilized by adjusting the on-off ratios of the first switching element 3 and the second switching element 5. Various operational waveforms of FIG. 10 components are shown in FIG. 11.

This circuit configuration is characterized in that any voltage higher than the input voltage is not applied to the first switching element 3 and the second switching element 5 and in that the transformer 20 is not DC-excited.

However, the conventional configuration described above has a problem in that a power loss is caused because a surge current is generated by parasitic capacities of the switching elements and a distributed capacity of the transformer which are shorted when the first switching element 3 and the second switching element 5 are turned on.

SUMMARY OF THE INVENTION

The present invention solves the above-described problem, and it is an object of the present invention to provide a switching power supply device wherein the voltage of the switching elements thereof is suppressed during turn-on time to suppress the generation of a surge current and a power loss for improved efficiency and reduced noise.

A switching power supply device of the present invention comprises:

a series circuit constituted by a first switch means which is connected to an input voltage and which is at least repeatedly turned on and off and a second switch means which is repeatedly turned on and off alternately with said first switch means;

a first capacitor connected to one end of said second switch means;

a transformer having a primary winding connected to said second switch means and the first capacitor and having one or more secondary windings;

a series circuit constituted by a second capacitor and a rectifier diode connected across said secondary winding of said transformer;

a series circuit constituted by an inductance element and a smoothing capacitor connected across said rectifier diode; and a control circuit for controlling the turning on and off of said first and second switch means based on the voltage across said smoothing capacitor, the voltage across said smoothing capacitor being supplied to the output.

With such a configuration, no spike current is generated when the first and second switch means are turned on because they are turned on after accumulated energy in the parasitic capacities of the switch means and the distributed capacity of the transformer is discharged, and no spike voltage due to leakage inductance of the transformer is generated when the first and second switch means are turned off. Preferably, the leakage inductance of the transformer is caused to resonate with the first or second capacitor to achieve the switching of the secondary rectifier diode at zero current. This is advantageous in that no turn-off recovery occurs and in that turn-off switching losses can be reduced because the turn-off current of the second switch means can be reduced. Further, the voltage applied to the switch means is an input voltage $V_{IN}$ and the transformer is not DC-excited as in the prior art half bridge converters. This makes it possible to provide a switching power supply device which is efficient and has low noise and high frequency characteristics.

BRIEF DESCRIPTION OF THE DRAWINGS

(FIG. 4(a), FIG. 4(b), FIG. 4(c), FIG. 4(d), FIG. 4(e), FIG. 4(f), and FIG. 4(g)) illustrates operational waveforms of the circuit configuration according to the present invention shown in FIG. 3.

(FIG. 6(a), FIG. 6(ba), FIG. 6(c), FIG. 6(d), FIG. 6(e), FIG. 6(f), and FIG. 6(g)) illustrates operational waveforms of the circuit configuration according to the present invention shown in FIG. 5.

(FIG. 8(a), FIG. 8(b), FIG. 8(c), FIG. 8(d), FIG. 8(e), FIG. 8(f), and FIG. 8(g)) illustrates operational waveforms of the circuit configuration according to the present invention shown in FIG. 7.

(FIG. 11(a), FIG. 11(b), FIG. 11(c), FIG. 11(d), FIG. 11(e), FIG. 11(f), and FIG. 11(g)) illustrates operational waveforms of the circuit configuration according to the prior art shown in FIG. 10.

DETAILED DESCRIPTION OF THE PREFERRED EMBODIMENTS

Figure 1:
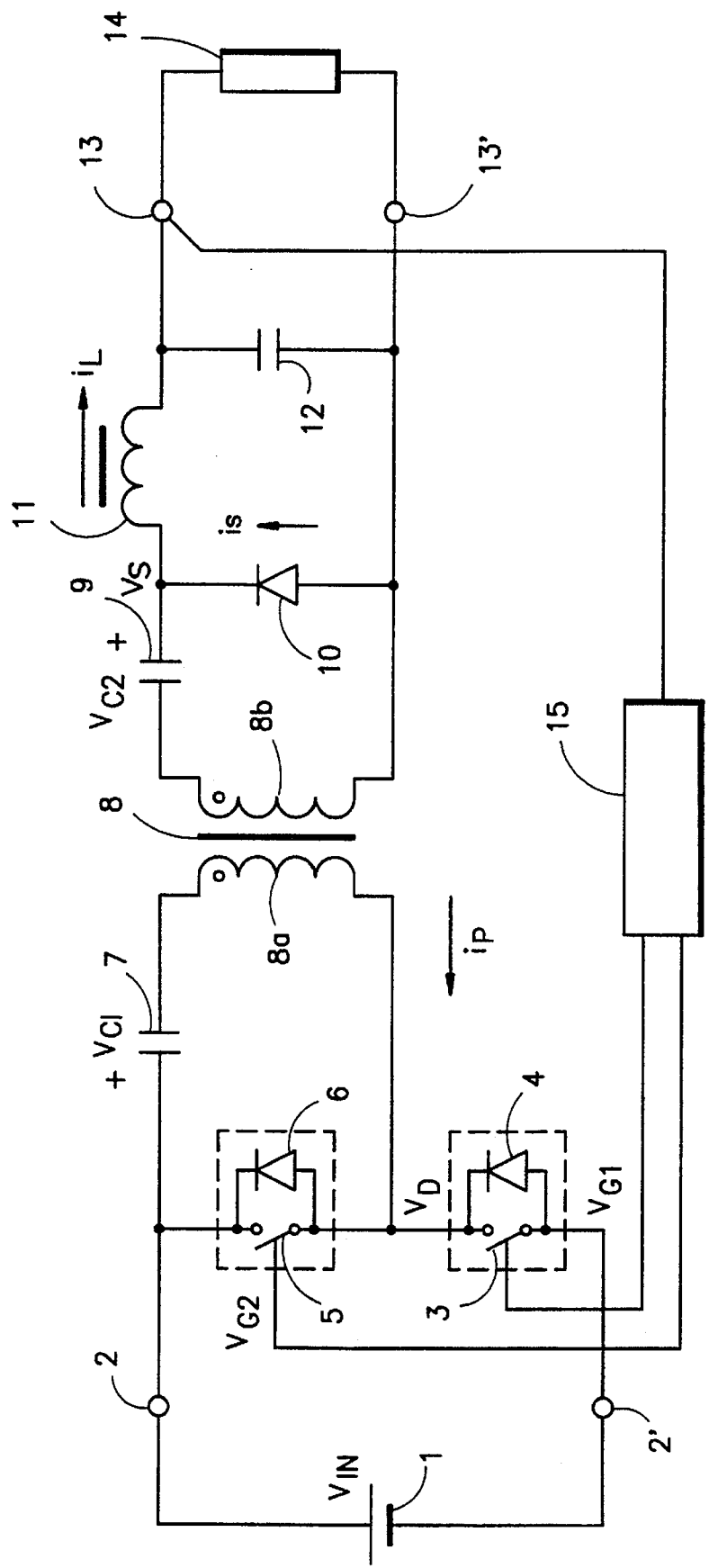
FIG. 1 illustrates a circuit configuration of a switching power supply device according to a first embodiment of the present invention.
Figure 10:
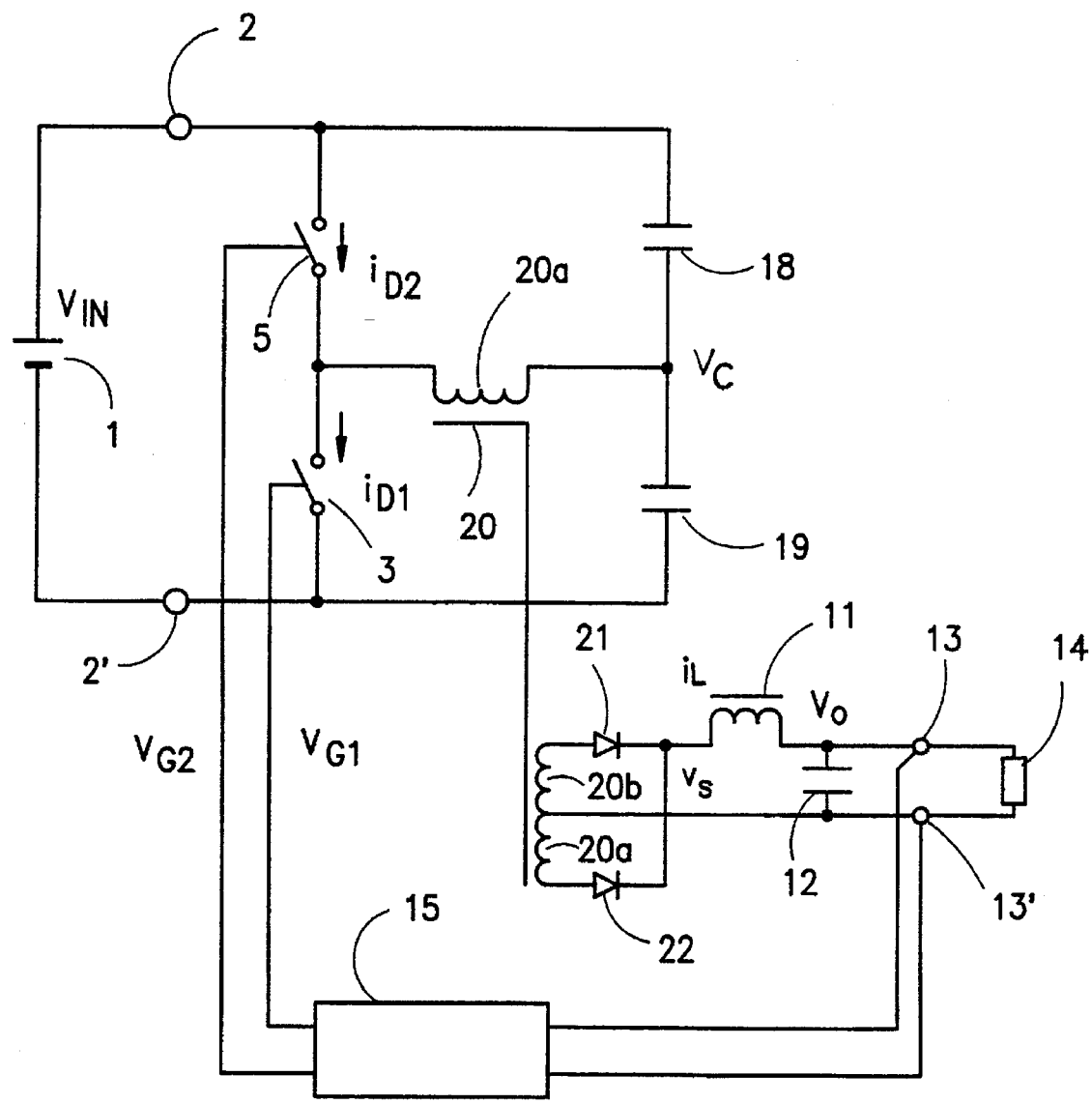
FIG. 10 illustrates a circuit configuration of a conventional switching power supply device.

A first embodiment of the present invention will now be described with reference to the accompanying drawings. FIG. 1 illustrates a circuit configuration of a switching power supply device according to the first embodiment of the present invention. In FIG. 1, parts identical to those in FIG. 10 are given like reference numbers and description will be omitted for such parts.

1 represents an input DC power supply whose input voltage is represented by $V_{IN}$. 2 and 2' represent input terminals. 3 represents a first switching element, and 4 represents a first diode. The first switching element 3 and the first diode 4 form a first switching means. 5 represents a second switching element, and 6 represents a second diode. The second switching element 5 and the second diode 6 form a second switching means. The first and second switching means are connected to the input terminals 2 and 2'. 7 represents a first capacitor which holds a DC voltage $V_{C1}$. 8 represents a transformer which has a primary winding 8a and one or more secondary windings 8b. The turn ratio of the primary winding 8a to the secondary winding 8b is n:1, and the primary winding 8a is connected across the second switching means through the first capacitor 7. 9 represents a second capacitor which holds a DC voltage $V_{C2}$. 10 represents a rectifier diode whose anode is connected to one end of the secondary winding 8b of the transformer and whose cathode is connected the other end of the secondary winding 8b of the transformer through the second capacitor 9. 11 represents an inductance element, and 12 represents a smoothing capacitor. The inductance element 11 and the smoothing capacitor 12 are connected across the rectifier diode 10. 13 and 13' represent output terminals, and 14 represents a load. 15 represents a control circuit which detects the voltage across the output terminals 13 and 13' and generates a control signal for changing the on-off ratios of the first switching element 3 and the second switching element 5 so that a constant output voltage is obtained. The control signal alternates between the first switch means and the second switch means.

The operation of a switching power supply device having the above-described configuration will now be described with reference to the operational waveform of each part of the device shown in FIG. 2.

Figure 2:
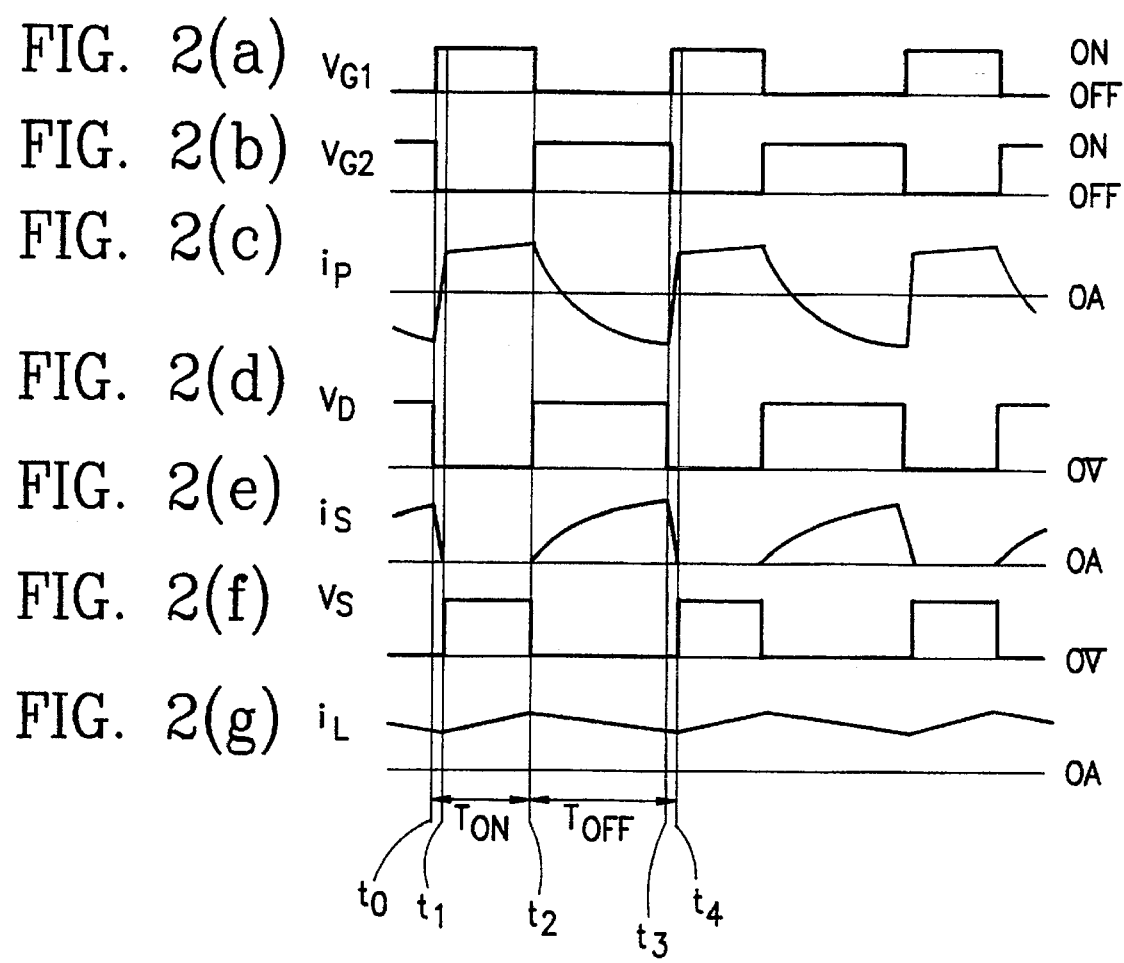
(FIG. 2(a), FIG. 2a(b), FIG. 2(c), FIG. 2(d), FIG. 2(e), FIG. 2(f), and FIG. 2(g)) illustrates operational waveforms of the circuit configuration according to the present invention shown in FIG. 1.

In FIG. 2, the waveform of a pulse $V_{G1}$ which drives the first switching element 3 output by the control circuit 15 is indicated by (a); the waveform of a pulse $V_{G2}$ which drives the second switching element 5 output by the control circuit 15 is indicated by (b); the waveform of a current $i_p$ through the primary winding of the transformer 8 is indicated by (c); the waveform of a voltage $V_D$ applied to the first switching means is indicated by (d); the waveform of a current $i_S$ flowing through the rectifier diode 10 is indicated by (e); the waveform of a voltage $V_S$ applied to the rectifier diode 10 is indicated by (f); and the waveform of a current $i_L$ flowing through the inductance element 11 is indicated by (g).

Changes in the operational state over time are indicated using $t_0$ through $t_4$ in the figure. At a point in time $t_0$, an ON signal from the control circuit 15 turns the first switching element 3 on and simultaneously turns the second switching element 5 off. Then, a voltage $V_{IN}-V_{C1}$ is applied to the primary winding 8a of the transformer 8. At this time, a voltage $(V_{IN}-V_{C1})/n$ is generated at the secondary winding 8b of the transformer 8, which turns the rectifier diode 10 off. A voltage $(V_{IN}-V_{C1})/n+V_{C2}-V_O$ is applied to the inductance element 11 to linearly increase a current flowing through the inductance element 11. The current $i_p$ flowing through the primary winding 8a of the transformer 8 is the sum of the primary-converted values of the excitation current of the transformer 8 and the current flowing through the secondary winding 8b. So, it linearly increases, resulting in the accumulation of excitation energy at the transformer 8 and the inductance element 11.

When the first switching element 3 is turned off by an OFF signal from the control circuit 15 at a point in time $t_2$, the current which has flowed through the first switching element 3 turns the second diode 6 on. Although an ON signal from the control circuit 15 simultaneously turns the second switching element 5 on, there is no change in the operation whether the on current flows through the second diode 6 or the second switching element 5. When the second diode 6 or the second switching element 5 is turned on, the DC voltage $V_{C1}$ held by the first capacitor 7 is applied to the primary winding 8a of the transformer 8. At the same time, a voltage $V_{C1}/n$ is generated at the secondary winding 8b of the transformer 8 and, as a result, the rectifier diode 10 is forward-biased and turned on. The current $i_S$ through the rectifier diode 10 is increased from zero due to the leakage inductance of the transformer while the current through the secondary winding 8b is gradually decreased. As the excitation current through the transformer 8 and the current through the secondary winding 8b are decreased, the current through the primary winding 8a is gradually decreased from a positive value and becomes a negative current. Since the rectifier diode 10 is on, the output voltage $V_O$ is applied to the inductance element 11 in the opposite direction. When an OFF signal from the control circuit 15 turns the second switching element 5 off with a negative current flowing through the second switching element 5, the first diode 4 is turned on because the leakage inductance of the transformer 8 makes the negative current continuous. Although an ON signal from the control circuit 15 simultaneously turns the first switching element 3 on, there is no change in the operation whether the current through the first switching means flows through the first switching element 3 or the first diode 4. When the first switching element 3 is turned on and the second switching element 5 is simultaneously turned off, a voltage $V_{IN}-V_{C1}$ is applied to the primary winding 8a of the transformer 8. A current which keeps the rectifier diode 10 on flowing through the secondary winding 8b of the transformer 8 is rapidly decreased to zero to turn the rectifier 10 off. The current through the primary winding 8a is increased with a decrease in the current through the secondary winding 8b. As the rectifier diode 10 is turned off, a voltage $(V_{IN}-V_{C1})/n+V_{C2}-V_C$ is applied to the inductance element 11 to accumulate excitation energy at the transformer 8 and the inductance element 11. This operation is repeated.

If the on time and off time of the first switching means are represented by $T_{ON}$ and $T_{OFF}$, respectively, the following equation is obtained from resetting conditions for the transformer 8.

$$(V_{IN}-V_{C1}) \times T_{ON} = V_{C1} \times T_{OFF}$$

If the time interval between $t_3$ and $t_4$ ($t_0$ and $t_1$) is ignored because it is short due to the resetting conditions for the inductance element 11, the following equation is obtained.

$$\{(V_{IN}-V_{C1})/n+V_{C2}-V_D\} \times T_{ON} = V_O \times T_{OFF}$$

The relationship between the voltage $V_{C1}$ and the voltage $V_{C2}$ is:

$$V_{C1}/n = V_{C2}$$

Therefore, the voltage $V_{C1}$ and the voltage $V_{C2}$ are obtained as follows.

$$V_{C1} = \delta V_{IN}$$

$$V_{C2} = \delta V_{IN}/n$$

$$V_O = \delta V_{IN}/n$$

Thus, the output voltage $V_O$ can be controlled by adjusting the on-off ratios of the first switching element 3 and the second switching element 5. If the time interval between $t_3$ and $t_4$ ($t_0$ and $t_1$) is considered, the output voltage is decreased. However, a predetermined voltage can be obtained by increasing accordingly. In this configuration, the first switching element 3 and the second switching element 5 are turned on immediately after the parasitic capacities of the switching elements and the distributed capacity of the transformer 8 are discharged. This makes it possible to suppress the generation of a spiky short-circuit current, to improve efficiency and to suppress the generation of noises. Further, a spike voltage generated when the first switching element 3 and the second switching element 5 are turned off due to the leakage inductance of the transformer 8 is effectively absorbed by the first capacitor 7 and the input DC power supply 1 because the first diode 4 and the second diode 6 are turned on. This eliminates the generation of a spike voltage. Although it has been described that the discharge of the parasitic capacities of the first and second switching means and the distributed capacity of the transformer 8 immediately before the turning on of the first switching means is a result of the leakage inductance at the transformer 8, it goes without saying that the discharged energy can be increased by series-connecting an inductance element to the primary winding 8a or the secondary winding 8b of the transformer 8. Further, the transformer 8 may be de-excited by decreasing the inductance thereof to assist the discharge of the parasitic capacities of the first and second switching means and the distributed capacity of the transformer 8. In addition, the voltage applied to the switching means is the input voltage $V_{IN}$, and the transformer is not DC-excited just as in the prior art half bridge converters. This makes it possible to provide a switching power supply device which is efficient and has low noise and high frequency characteristics.

Figure 3:
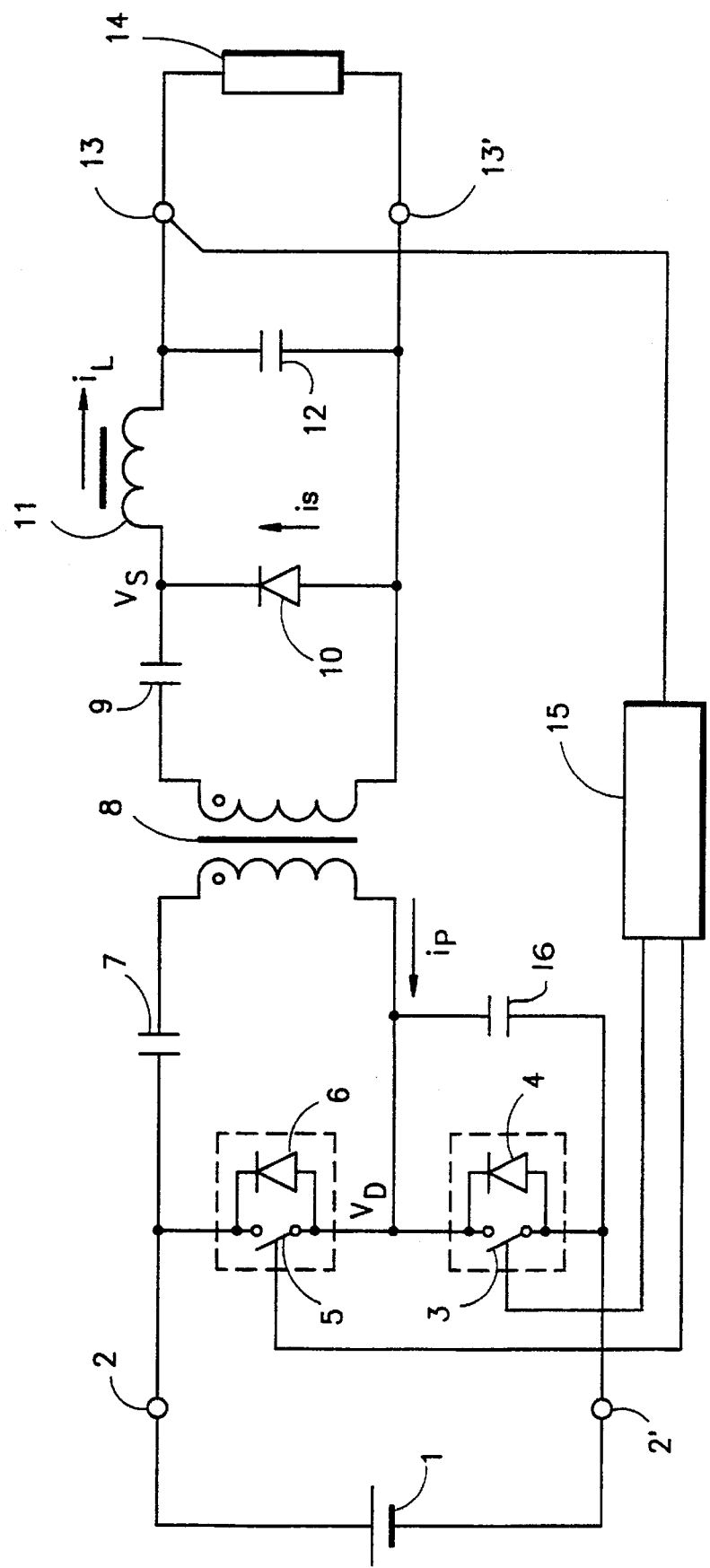
FIG. 3 illustrates a circuit configuration of a switching power supply device according to a second embodiment of the present invention.

A second embodiment of the present invention will now be described with reference to the accompanying drawings. FIG. 3 illustrates a circuit configuration of a switching power supply device according to the second embodiment of the present invention. In FIG. 3, parts identical to those in FIGS. 1 and 10 are given like reference numbers and description will be omitted for such parts.

1 represents an input DC power supply whose input voltage is represented by $V_{IN}$. 2 and 2' represent input terminals. 3 represents a first switching element, and 4 represents a first diode. The first switching element 3 and the first diode 4 form a first switching means. 5 represents a second switching element, and 6 represents a second diode. The second switching element 5 and the second diode 6 form a second switching means. The first and second switching means are series-connected and are connected to the input terminals 2a and 2b. 7 represents a first capacitor which holds a DC voltage $V_{C1}$. 8 represents a transformer which has a primary winding 8a and one or more secondary windings 8b. The turn ratio of the primary winding 8a to the secondary winding 8b is n:1, and the primary winding 8a is connected across the second switching means through the first capacitor 7. 9 represents a second capacitor which holds a DC voltage $V_{C2}$. 10 represents a rectifier diode whose anode is connected to one end of the secondary winding 8b of the transformer and whose cathode is connected the other end of the secondary winding 8b of the transformer through the second capacitor 9. 11 represents an inductance element, and 12 represents a smoothing capacitor. The inductance element 11 and the smoothing capacitor 12 are series-connected and are connected across the rectifier diode 10. 13 and 13' represent output terminals, and 14 represents a load. 15 represents a control circuit which detects the voltage across the output terminals 13 and 13' and generates a control signal for changing the on-off ratios of the first switching element 3 and the second switching element 5 so that a constant output voltage is obtained. 16 represents a third capacitor which is connected across the first switching element 3 to suppress abrupt changes in voltages applied to the first switching element 3 and the second switching element 5. The control signal from the control circuit 15 is set so that the first switching element 3 and the second switching element 5 will be off at the same time.

The operation of a switching power supply device having the above-described configuration will now be described with reference to the operational waveform in FIG. 4.

In FIG. 4, the waveform of a pulse $V_{G1}$ which drives the first switching element 3 output by the control circuit 15 is indicated by (a); the waveform of a pulse $V_{G2}$ which drives the second switching element 5 output by the control circuit 15 is indicated by (b); the waveform of a current $i_p$ through the primary winding of the transformer 8 is indicated by (c); the waveform of a voltage $V_D$ applied to the first switching means is indicated by (d); the waveform of a current $i_S$ flowing through the rectifier diode 10 is indicated by (e); the waveform of a voltage $V_S$ applied to the rectifier diode 10 is indicated by (f); and the waveform of a current $i_L$ flowing through the inductance element 11 is indicated by (g).

The operation is basically the same as that of the circuit configuration according to the first embodiment except that the first switching element 3 and the second switching element 5 are off at the same time and that a setting is made so that the voltages applied to the first switching element 3 and the second switching element 5 are changed during the off time. The third capacitor 16 connected across the first switching element 3 moderates the steepness of the rises and falls of the voltage waveforms when the first switching element 3 is turned on and off. In addition, since the first switching element 3 can be turned on after the electrical charge accumulated in the third capacitor 16 is regenerated to the input DC power supply 1, a turn-on loss at the first switching element 3 can be avoided. The second switching element 5 also has the same effect.

The operations other than those at transitions as described above are similar to those of the embodiment illustrated in FIG. 1 and therefore will not be described. The addition of a capacitor results in a change in the output impedance of each of the windings of the transformer 8 at transitions. There will be a change in the initial value of the current through each winding when the first switching element 3 is turned off. However, such changes have a little influence on the control operations. Since the waveforms of the voltages applied to the first switching element 3 and the second switching element 5 are not steep, there are advantages in that the generation of noises is suppressed and in that the generation of switching losses at the first switching element 3 and the second switching element 5 is suppressed. The addition of the third capacitor 16 does not cause any spike current when the first switching element 3 and the second switching element 5 are turned on because the electrical charge accumulated in the capacitor is discharged immediately before they are turned on.

Like the first embodiment, the first switching element 3 and the second switching element 5 are turned on immediately after the parasitic capacities of the switching elements and the distributed capacity of the transformer 8 are discharged. This makes it possible to suppress the generation of a spiky short-circuit current, to improve efficiency and to suppress the generation of noises. Further, a spike voltage generated when the first switching element 3 and the second switching element 5 are turned off due to the leakage inductance of the transformer 8 is effectively absorbed by the first capacitor 7 and the input DC power supply 1 because the first diode 4 and the second diode 6 are turned on. This eliminates the generation of a spike voltage. Although it has been described that the discharge of the parasitic capacities of the third capacitor 16 and the first and second switching means and the distributed capacity of the transformer 8 immediately before the turning on of the first switching means is a result of the leakage inductance at the transformer 8, it goes without saying that the discharged energy can be increased by series-connecting an inductance element to the primary winding 8a or the secondary winding 8b of the transformer 8. Further, the transformer 8 may be de-excited by decreasing the inductance thereof to assist the discharge of the parasitic capacities of third capacitor 16 and the first and second switching means and the distributed capacity of the transformer 8. In addition, the voltage applied to the switching means is the input voltage $V_{IN}$, and the transformer is not DC-excited just as in the prior art half bridge converters. This makes it possible to provide a switching power supply device which is efficient and has low noise and high frequency characteristics.

Figure 5:
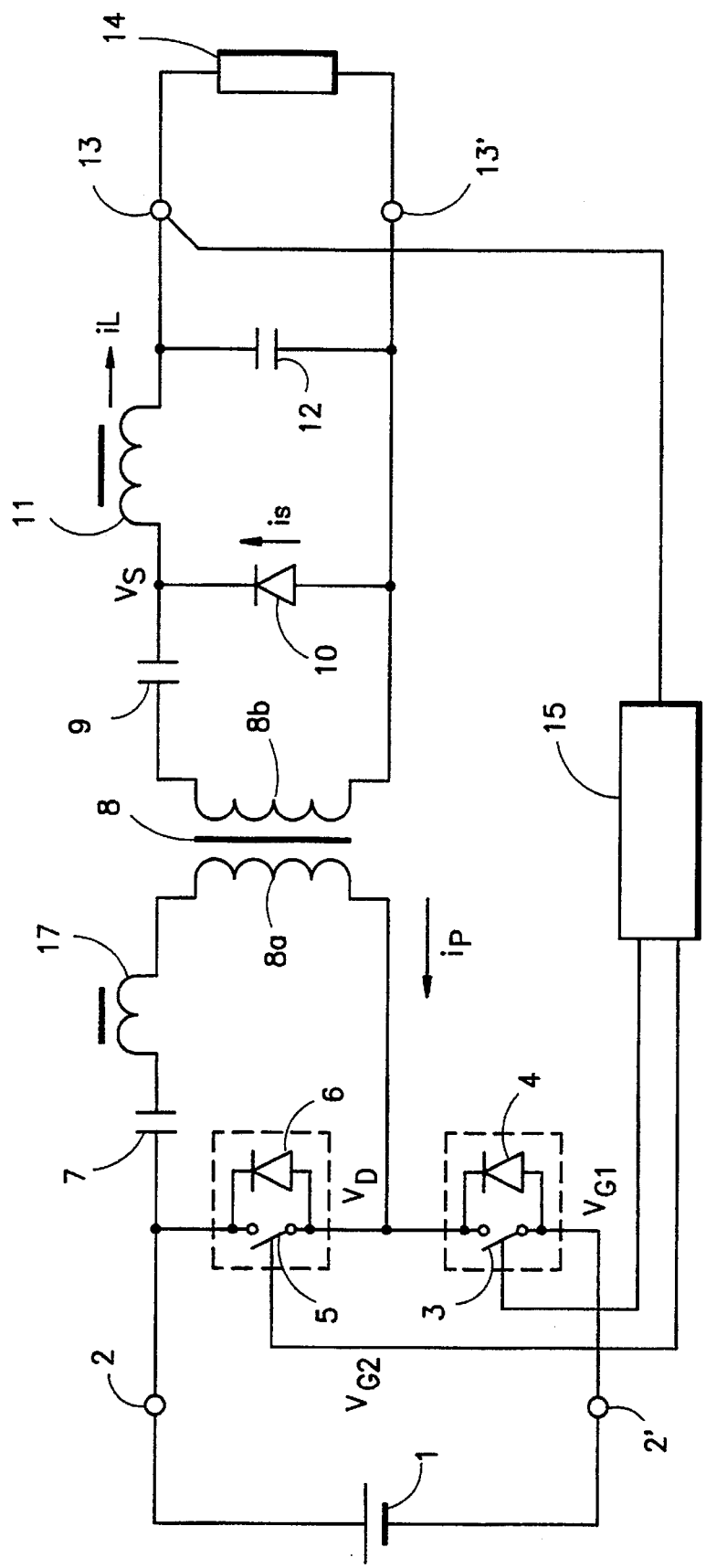
FIG. 5 illustrates a circuit configuration of a switching power supply device according to a third embodiment of the present invention.

A third embodiment of the present invention will now be described with reference to the accompanying drawings. FIG. 5 illustrates a circuit configuration of a switching power supply device according to the third embodiment of the present invention. In FIG. 5, parts identical to those in FIG. 10 are given like reference numbers and the description will be omitted for such parts.

1 represents an input DC power supply whose input voltage is represented by $V_{IN}$. 2 and 2' represent input terminals. 3 represents a first switching element, and 4 represents a first diode. The first switching element 3 and the first diode 4 form a first switching means. 5 represents a second switching element, and 6 represents a second diode. The second switching element 5 and the second diode 6 form a second switching means. The first and second switching means are series-connected to each other and are connected to the input terminals 2 and 2'. 7 represents a first capacitor which holds a DC voltage $V_{C1}$. 8 represents a transformer which has a primary winding 8a and one or more secondary windings 8b. The turn ratio of the primary winding 8a to the secondary winding 8b is n:1, and the primary winding 8a is connected across the second switching means through the first capacitor 7. 9 represents a second capacitor which holds a DC voltage $V_{C2}$. 10 represents a rectifier diode whose anode is connected to one end of the secondary winding 8b of the transformer 8 and whose cathode is connected the other end of the secondary winding 8b of the transformer through the second capacitor 9. 11 represents an inductance element, and 12 represents a smoothing capacitor. The inductance element 11 and the smoothing capacitor 12 are series-connected and are connected across the rectifier diode 10. 13 and 13' represent output terminals, and 14 represents a load. 15 represents a control circuit which detects the voltage across the output terminals 13 and 13' and generates a control signal for changing the on-off ratios of the first switching element 3 and the second switching element 5 so that a constant output voltage is obtained.

17 represents a leakage inductance or an inductance element which is series-connected to the primary winding 8a of the transformer 8 and which resonates with the first capacitor 7 during the on time of the second switching element 5, the resonance current being the output current transmitted to the secondary winding 8b of the transformer 8.

The operation of a switching power supply device having the above-described configuration will now be described with reference to the operational waveform in FIG. 6.

In FIG. 6, the waveform of a pulse $V_{G1}$ which drives the first switching element 3 output by the control circuit 15 is indicated by (a); the waveform of a pulse $V_{G2}$ which drives the second switching element 5 output by the control circuit 15 is indicated by (b); the waveform of a current $i_p$ through the primary winding of the transformer 8 is indicated by (c); the waveform of a voltage $V_D$ applied to the first switching means is indicated by (d); the waveform of a current $i_S$ flowing through the rectifier diode 10 is indicated by (e); the waveform of a voltage $V_S$ applied to the rectifier diode 10 is indicated by (f); and the waveform of a current $i_L$ flowing through the inductance element 11 is indicated by (g). Changes in the operational state are indicated by $t_1$ through $t_4$ in the figure.

The operation is basically the same as that of the circuit configuration according to the first embodiment except that the first capacitor 7 resonates with the leakage inductance or the inductance element 17 when the second switching element 5 is on. Since the resonance frequency is set sufficiently low, the current through the secondary winding of the transformer 8 is in the form of a sine wave which rises from zero and returns to zero at t3. Therefore, the rectifier diode 10 switches at zero current, and no recovery occurs.

Further, since the inductance of the transformer 8 is set sufficiently small so that the excitation current will be negative, a setting is made to cause a current in the opposite direction so that the electric power is regenerated to the input DC power supply 1 when the second switching means is turned off. It is therefore possible to discharge the parasitic capacities of the first switching element 3 and the second switching element 5 and the distributed capacity of the transformer 8.

The DC voltages $V_{C1}$ and $V_{C2}$ are actually the sums of DC voltage components and fluctuating components which are resonance voltages. However, the conversion ratio between the input and output voltages is almost the same as that in the first embodiment because the fluctuating components produced by the resonance voltages can be set sufficiently small.

The operations other than those at transitions as described above are similar to those of the embodiment illustrated in FIG. 1 and therefore will not be described. Like the first embodiment, the first switching element 3 and the second switching element 5 are turned on immediately after the parasitic capacities of the switching elements and the distributed capacity of the transformer 8 are discharged. This makes it possible to suppress the generation of a spiky short-circuit current, to improve efficiency and to suppress the generation of noises. Further, a spike voltage generated when the first switching element 3 and the second switching element 5 are turned off due to the leakage inductance of the transformer 8 is effectively absorbed by the first capacitor 7 and the input DC power supply 1 because the first diode 4 and the second diode 6 are turned on. This eliminates the generation of a spike voltage. In addition, the voltage applied to the switching means is the input voltage $V_{IN}$, and the transformer is not DC-excited just as in the prior art half bridge converters. This makes it possible to provide a switching power supply device which is efficient and has low noise and high frequency characteristics.

Figure 7:
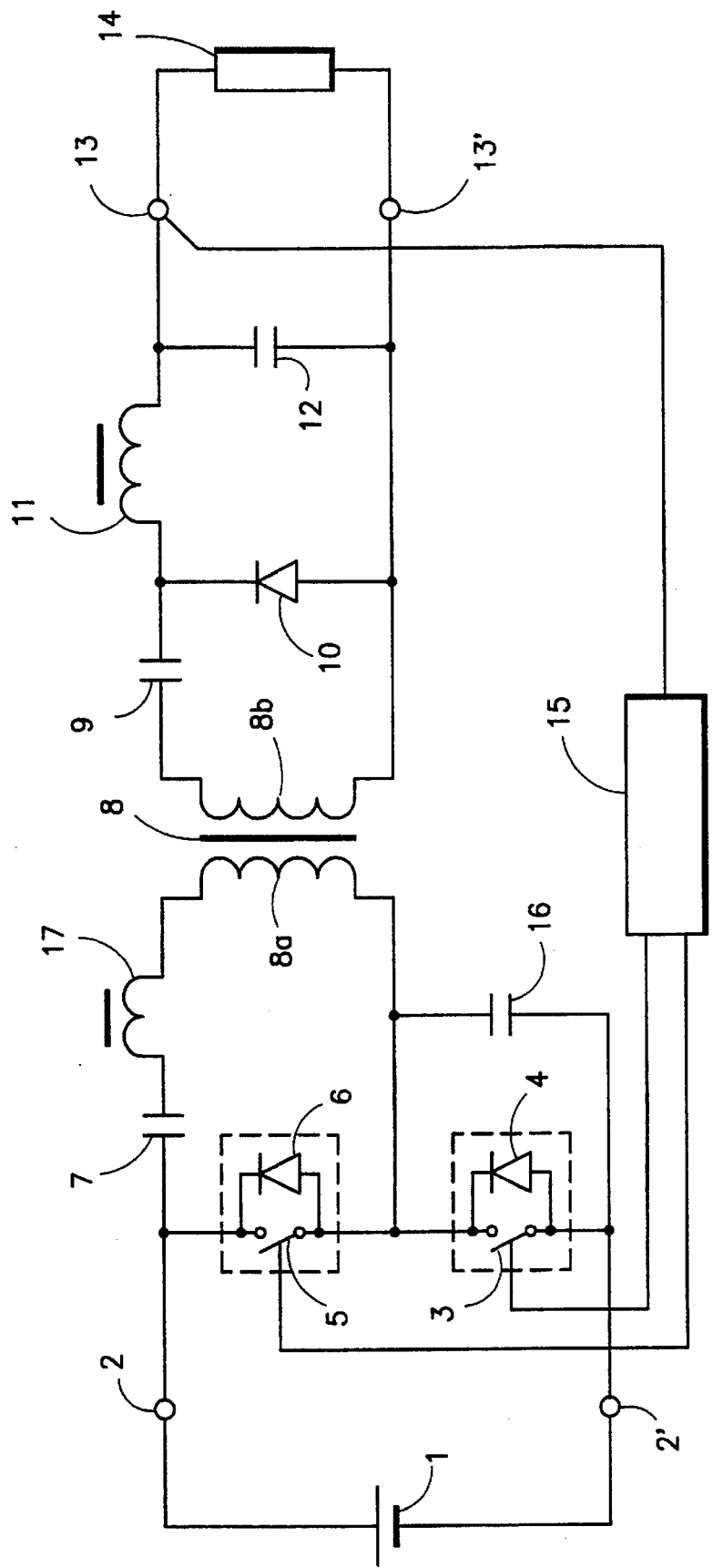
FIG. 7 illustrates a circuit configuration of a switching power supply device according to a fourth embodiment of the present invention.

A fourth embodiment of the present invention will now be described with reference to the accompanying drawings. FIG. 7 illustrates a circuit configuration of a switching power supply device according to the fourth embodiment of the present invention. In FIG. 7, parts identical to those in FIG. 10 are given like reference numbers and description will be omitted for such parts.

1 represents an input DC power supply whose input voltage is represented by $V_{IN}$. 2 and 2' represent input terminals. 3 represents a first switching element, and 4 represents a first diode. The first switching element 3 and the first diode 4 form a first switching means. 5 represents a second switching element, and 6 represents a second diode. The second switching element 5 and the second diode 6 form a second switching means. The first and second switching means are series-connected and are connected to the input terminals 2 and 2'. 7 represents a first capacitor which holds a DC voltage $V_{C1}$. 8 represents a transformer which has a primary winding 8a and one or more secondary windings 8b. The turn ratio of the primary winding 8a to the secondary winding 8b is n:1, and the primary winding 8a is connected across the second switching means through the first capacitor 7. 9 represents a second capacitor which holds a DC voltage $V_{C2}$. 10 represents a rectifier diode whose anode is connected to one end of the secondary winding 8b of the transformer and whose cathode is connected to the other end of the secondary winding 8b of the transformer through the second capacitor 9. 11 represents an inductance element, and 12 represents a smoothing capacitor. The inductance element 11 and the smoothing capacitor 12 are series-connected to each other and are connected across the rectifier diode 10. 13 and 13' represent output terminals, and 14 represents a load. 15 represents a control circuit which detects the voltage across the output terminals 13 and 13' and generates a control signal for changing the on-off ratios of the first switching element 3 and the second switching element 5 so that a constant output voltage is obtained.

17 represents a leakage inductance or an inductance element which is series-connected to the primary winding 8a of the transformer 8 and which resonates with the first capacitor 7 during the on time of the second switching element 5, the resonance current being the output current transmitted to the secondary winding 8b of the transformer 8.

16 represents a third capacitor which is connected across the first switching element 3 to suppress abrupt changes in voltages applied to the first switching element 3 and the second switching element 5. ON and OFF signals from the control circuit 15 are set so that the first switching element 3 and the second switching element 5 will be off simultaneously.

The operation of a switching power supply device having the above-described configuration will now be described with reference to the operational waveform in FIG. 8.

In FIG. 8, the waveform of a pulse $V_{G1}$ which drives the first switching element 3 output by the control circuit 15 is indicated by (a); the waveform of a pulse $V_{G2}$ which drives the second switching element 5 output by the control circuit 15 is indicated by (b); the waveform of a current $i_p$ through the primary winding of the transformer 8 is indicated by (c); the waveform of a voltage $V_D$ applied to the first switching means is indicated by (d); the waveform of a current $i_S$ flowing through the rectifier diode 10 is indicated by (e); the waveform of a voltage $V_S$ applied to the rectifier diode 10 is indicated by (f); and the waveform of a current $i_L$ flowing through the inductance element 11 is indicated by (g).

The operation is basically the same as that of the circuit configuration according to the third embodiment except that the first switching element 3 and the second switching element 5 are off simultaneously and that a setting is made so that the voltages applied to the first switching element 3 and the second switching element 5 are changed during the off time. The third capacitor 16 connected across the first switching element 3 moderates the steepness of the rises and falls of the voltage waveforms when the first switching element 3 is turned on and off. In addition, since the first switching element 3 can be turned on after the electrical charge accumulated in the third capacitor 16 is regenerated to the input DC power supply 1, a turn-on loss at the first switching element 3 can be avoided. The second switching element 5 also has the same affect.

The operations other than those at transitions as described above are similar to those of the embodiment illustrated in FIG. 5 and therefore will not be described. The addition of a capacitor results in a change in the output impedance of each of the windings of the transformer 8 at transitions. Especially, there will be a change in the initial value of the current through each winding when the first switching element 3 is turned off. However, such changes have little influence on the control operations. In addition to the advantage obtained by using the waveform of the current through the secondary winding as the resonance current, since the waveforms of the voltages applied to the first switching element 3 and the second switching element 5 are not steep, there are advantages in that the generation of noises is suppressed and in that the generation of switching losses at the first switching element 3 and the second switching element 5 is suppressed. Like the first embodiment, the first switching element 3 and the second switching element 5 are turned on immediately after the parasitic capacities of the switching elements and the distributed capacity of the transformer 8 are discharged. This makes it possible to suppress the generation of a spiky short-circuit current, to improve efficiency and to suppress the generation of noises. Further, a spike voltage generated when the first switching element 3 and the second switching element 5 are turned off due to the leakage inductance of the transformer 8 is effectively absorbed by the first capacitor 7 and the input DC power supply 1 because the first diode 4 and the second diode 6 are turned on. This eliminates the generation of a spike voltage. In addition, the voltage applied to the switching means is the input voltage $V_{IN}$, and the transformer is not DC-excited just as in the prior art half bridge converters. This makes it possible to provide a switching power supply device which is efficient and has low noise and high frequency characteristics.

While specific illustrated embodiments have been shown and described, it will be appreciated by those skilled in the art that various modifications, changes and additions can be made to the invention without departing from the spirit and scope thereof as set forth in the following claims. Meanwhile as the switch means a FET is preferable, and the FET operates equivalently to the circuit of the switching element and the diode.

Figure 9:
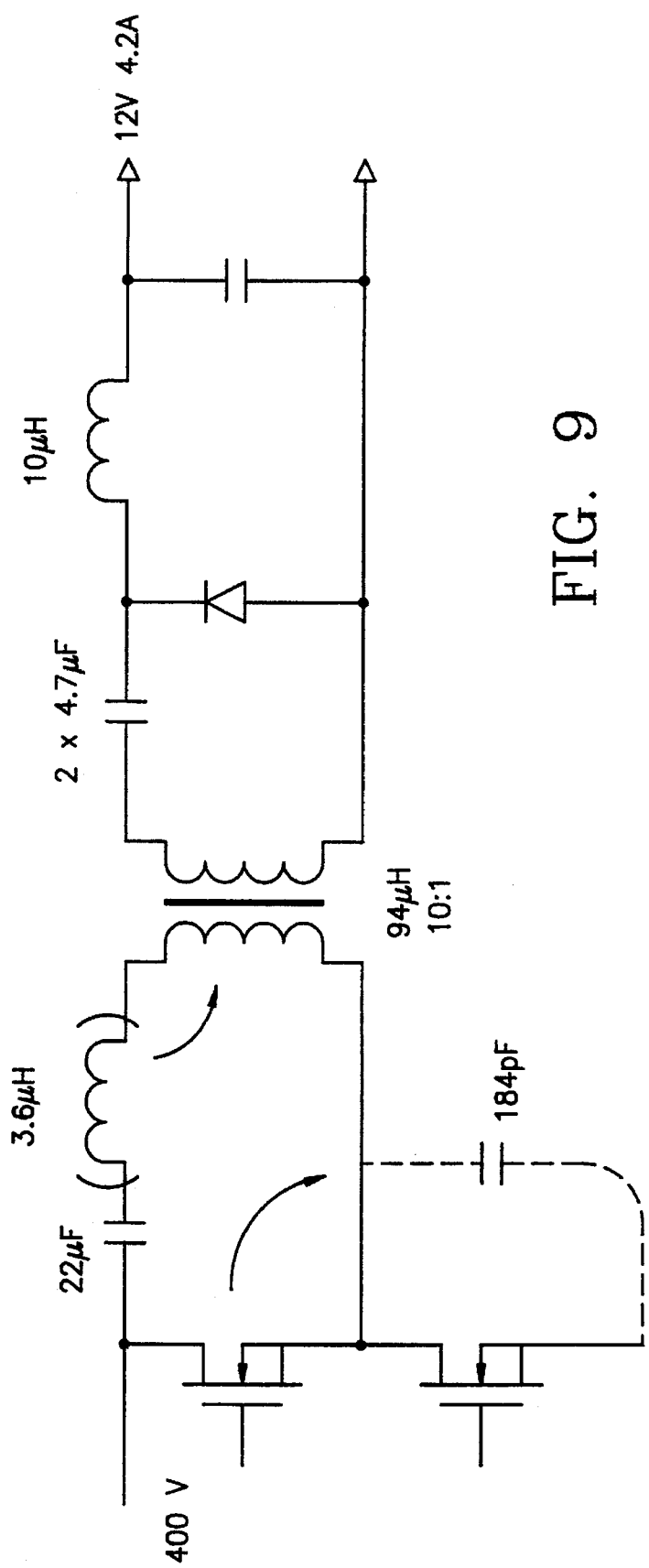
FIG. 9 illustrates a part of a circuit configuration of a switching power supply device according to another embodiment of the present invention.

In the second and fourth embodiments the capacitor is not included in the first switch means and connected in parallel to the first switch means, but when a FET is used as the switch means as shown in FIG. 9, instead of the not-included (outside) capacitor, parasitic capacitance (50–1000 pF) of the FET can be positively utilized. Concretely for example when a FET (500 V,2,4 A)(IRFR 420 of IR company's product) is used as a switching power supply device with an output 50 W, switching frequency 500 kHz for 400 V input the parasitic capacitance is 92 pF for each one, and therefore it operates equivalently to 184 pF(catalog value).

In the third and fourth embodiments the resonant inductance is not included with the first capacitor 7 and connected in series to the first capacitor 7; but instead of the not-included (outside) inductance, leak inductance of a transformer can be positively utilized. The value the leak inductance is about 3.6 µH.

In the above embodiments the number of secondary windings is one, but the number can be plural.

What is claimed is:

1. A switching power supply device comprising:
    a series circuit constituted by a first switch means which is connected to an input voltage and which is repeatedly turned on and off, and a second switch means which is repeatedly turned on and off to alternate with said first switch means;
    a first capacitor connected to one end of said second switch means;
    a transformer having a primary winding connected to said second switch means and said first capacitor and having at least one secondary winding;
    a series circuit constituted by a second capacitor, and a rectifier diode connected across said at least one secondary winding of said transformer;
    a series circuit constituted by an inductance element and a smoothing capacitor connected across said rectifier diode; and a control circuit for controlling turning on and turning off of said first and second switch means in order to control an output voltage, said output voltage being a voltage across said smoothing capacitor.

2. The switching power supply device according to claim 1, further comprising a capacitor connected across at least one of said first switch means and said second switch means, said control circuit controlling said turning on and off of said first and second switch means so that there is a period during which both of said switch means are off.

3. The switching power supply device according to claim 1, wherein each of said first and second switch means is constituted by a switching element and a diode which are connected in parallel.

4. The switching power supply device according to claim 1, wherein said first and second switch means each include a FET.

5. A switching power supply device comprising:

a series circuit constituted by a first switch means which is connected to an input voltage and which is repeatedly turned on and off, and a second switch means which is repeatedly turned on and off to alternate with said first switch means;

a first capacitor connected to one end of said second switch means;

a transformer having a primary winding connected to said second switch means and said first capacitor and having at least one secondary winding;

a series circuit constituted by a second capacitor, and a rectifier diode connected across said at least one secondary winding of said transformer;

a series circuit constituted by an inductance element and a smoothing capacitor connected across said rectifier diode; and a control circuit for controlling turning on and off of said first and second switch means in order to control an output voltage, and wherein, in a loop including said first and second capacitors, said rectifier diode, and said second switching means coupled through said primary and secondary windings of said transformer;

at least one of said first capacitor and said second capacitor resonates with a leakage inductance of the said primary and secondary windings of said transformer, and an external inductance;

said secondary winding of said transformer serves as a resonance current; and said output voltage is a voltage across said smoothing capacitor.

6. The switching power supply device according to claim 5, wherein each of said first and second switch means is constituted by a switching element and a diode which are connected in parallel.

7. The switching power supply device according to claim 5, wherein said first and second switch means each include a FET.

8. A switching power supply device comprising:

a series circuit constituted by a first switch means which is connected to an input voltage and which is repeatedly turned on and off, and a second switch means which is repeatedly turned on and off to alternate with said first switch means;

a third capacitor connected across at least one of said first switch means and said second switch means;

a first capacitor connected to one end of said second switch means;

a transformer having a primary winding connected to said second switch means and said first capacitor and having at least one secondary winding;

a series circuit constituted by a second capacitor, and a rectifier diode connected across said at least one secondary winding of said transformer;

a series circuit constituted by an inductance element and a smoothing capacitor connected across said rectifier diode; and a control circuit for controlling turning on and off of said first and second switch means so that there is a period during which both of said switch means are off;

wherein, in a loop including said first and second capacitors, said rectifier diode, and said second switching means coupled through said primary and secondary windings of said transformer;

at least one of said first capacitor and second capacitor resonates with a leakage inductance of said primary and secondary windings of said transformer or an external inductance;

said secondary winding of said transformer serves as a resonance current; and said output voltage is a voltage across said smoothing capacitor.

9. The switching power supply device according to claim 8, wherein each of said first and second switch means is constituted by a switching element and a diode which are connected in parallel.

10. The switching power supply device according to claim 8, wherein said first and second switch means each include a FET.

* * * * *